United States Patent
Zhang et al.

(10) Patent No.: US 9,579,744 B2
(45) Date of Patent: Feb. 28, 2017

(54) RESISTANCE WELDING WITH MINIMIZED WELD EXPULSION

(71) Applicants: GM GLOBAL TECHNOLOGY OPERATIONS LLC, Detroit, MI (US); SHANGHAI JIAO TONG UNIVERSITY, Shanghai (CN)

(72) Inventors: Yansong Zhang, Shanghai (CN); Guanlong Chen, Shanghai (CN); Pei-Chung Wang, Troy, MI (US); Yang-Yang Zhao, Fuzhou (CN); Xinmin Lai, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 789 days.

(21) Appl. No.: 13/954,481

(22) Filed: Jul. 30, 2013

(65) Prior Publication Data

US 2015/0034609 A1 Feb. 5, 2015

(51) Int. Cl.
*B23K 11/11* (2006.01)
*B23K 11/24* (2006.01)
*B23K 11/16* (2006.01)
*B23K 11/25* (2006.01)

(52) U.S. Cl.
CPC ............ *B23K 11/115* (2013.01); *B23K 11/16* (2013.01); *B23K 11/256* (2013.01); *G05B 2219/45135* (2013.01)

(58) Field of Classification Search
CPC ..... B23K 11/115; B23K 11/16; B23K 11/256; B23K 11/24; B23K 11/241; G05B 2219/45135
See application file for complete search history.

(56) References Cited

U.S. PATENT DOCUMENTS

| | | | | |
|---|---|---|---|---|
| 4,924,057 A | * | 5/1990 | Puddle ................. | B23K 11/185 219/118 |
| 2003/0089684 A1 | * | 5/2003 | Beauregard .......... | B23K 11/314 219/89 |

(Continued)

FOREIGN PATENT DOCUMENTS

| | | |
|---|---|---|
| DE | 102012000462 A1 | 7/2013 |
| JP | 2005-262259 A * | 9/2005 |

(Continued)

OTHER PUBLICATIONS

Machine translation of Japan Patent document No. 2005-262,259, Apr. 2016.*

(Continued)

*Primary Examiner* — Geoffrey S Evans
(74) *Attorney, Agent, or Firm* — Quinn Law Group

(57) ABSTRACT

A system for forming a weld nugget in a metal work piece includes a power supply, actuator, electrodes, and controller. The actuator delivers a variable electrode force to the work piece in response to a force command. The controller executes a method by transmitting a welding current command to the power supply to cause the power supply to output a welding current to the electrodes. The controller transmits the force command to the actuator to apply the variable electrode force, via the electrodes, to the work piece at a first force level. The variable electrode force increases from a second force level immediately upon conclusion of a first duration to minimize weld expulsion. The second force level commences at a point in time in the dynamic resistance profile at which a dynamic resistance value of the work piece decreases at a threshold rate during formation of the weld nugget.

20 Claims, 4 Drawing Sheets

(56) References Cited

U.S. PATENT DOCUMENTS

| | | | | |
|---|---|---|---|---|
| 2007/0187370 A1* | 8/2007 | Hochhalter | .......... | B23K 11/318 219/86.32 |
| 2010/0019785 A1* | 1/2010 | Wang | .................... | G01N 27/048 324/696 |
| 2011/0272384 A1* | 11/2011 | Matsushita | ........... | B23K 11/115 219/91.2 |
| 2013/0020288 A1* | 1/2013 | Moision | ................ | B23K 11/115 219/108 |

FOREIGN PATENT DOCUMENTS

| | | | |
|---|---|---|---|
| JP | 2010-240740 A | * | 10/2010 |
| WO | WO-2007/077393 A2 | * | 7/2007 |
| WO | WO-2014/171495 A1 | * | 10/2014 |

OTHER PUBLICATIONS

Machine translation of Japan Patent document No. 2010-240, Apr. 2016.*

Machine translation of German Patent document No. 102012000462, Apr. 2016.*

Senkara et al., "Expulsion Prediction in Resistance Spot Welding", Apr. 2004, Welding Journal, vol. 132, pp. 123-132.*

Ji et al., "Dynamic Electrode Force and Displacement in Resistance Spot Welding of Aluminum", Aug. 2004, Journal of Manufacturing Science and Engineering, vol. 126, pp. 605-610.*

Hwang et al., "Expulsion Reduction in Resistance Spot Welding by Controlling of welding Current Waveform", Dec. 2011, Elsevier, Procedia Engineering vol. 10, pp. 2775-2781.*

* cited by examiner

RESISTANCE WELDING WITH MINIMIZED WELD EXPULSION

TECHNICAL FIELD

The present disclosure relates to resistance welding with minimized weld expulsion.

BACKGROUND

The process of resistance welding, with or without structural adhesives, is used to join adjacent sheet metal panels or other metal components. In conventional resistance welding processes, such panels are clamped together between opposing welding electrodes. Electrical welding current is then passed between the electrodes through the panel/component material. The dynamic resistance of the material generates intense heat at the faying interfaces of the work piece, i.e., any substrate-to-substrate interfacing surfaces, as well as at any electrode-to-work piece interfaces. The heat momentarily melts the panel material at the faying interfaces. When the material cools, a solid weld nugget is formed. Adhesive materials are often used at the faying interfaces to strengthen the weld nugget in a process referred to as weld bonding.

Historically, the presence of sparks in a resistance welding process has provided a type of visual assurance to a welding operator that a weld nugget of sufficient size was formed. The sparks themselves are expelled droplets of molten metal commonly referred to as weld spatter. Weld spatter material is cleaned from any cosmetic appearance surfaces of the work pieces during production, e.g., from the finished external metal show surfaces of an automotive body panel. Additionally, some metal work pieces are drawn through a bath of electro-coating material after the resistance welding/weld bonding process is completed. Accumulated weld spatter tends to separate in the bath and accumulate in the bottom of the tank. Cleaning of accumulated weld spatter and/or of the bath tanks results in additional down time and other process inefficiencies.

SUMMARY

A welding system and associated method are disclosed herein, both of which are intended to minimize weld expulsion, and thus minimize weld spatter, in weld bonding and other resistance welding processes. A potential benefit of the present approach is the reduction of cost and downtime associated with weld spatter cleaning without compromising weld strength.

In a particular embodiment, a system for forming a weld nugget in a multi-layer or multi-sheet stack up, with the stack up referred to hereinafter as a work piece, includes a welding power supply, an actuator, a pair of electrodes, and a controller. The electrodes are operatively connected to the welding power supply and to the actuator. The actuator delivers a variable electrode force to the work piece via the pair of electrodes in response to a force command issued from the controller. The controller has a processor and computer-readable memory. The memory includes a calibrated dynamic resistance profile for the work piece and a set of instructions, executable via the processor, for forming the weld nugget.

The controller is programmed or otherwise configured to transmit a welding current command to the welding power supply. This causes the welding power supply to output a welding current to the electrodes, and to transmit the force command to the actuator. The actuator applies the variable electrode force, via the pair of electrodes, to the work piece at a first force level and holds this for a first duration. The controller then increases the variable electrode force from the first force level to a second force level immediately upon conclusion of the first duration.

As set forth herein, the second force level commences at a point in time in the calibrated dynamic resistance profile at which a dynamic resistance value of the work piece decreases at a threshold rate during formation of the weld nugget. The second level may be held until the end of the weld cycle needed for forming the weld nugget, or additional force levels may be used over this same duration depending on the configuration.

The actuator may be a linear servo actuator in one embodiment, or a pneumatic actuator in another embodiment.

A method for forming the weld nugget is also disclosed. The method includes positioning the metal work piece with respect to a pair of electrodes that are operatively connected to a welding power supply and to an actuator, and then transmitting a welding current command from a controller to the welding power supply to cause the welding power supply to output a welding current to the electrodes. The method further includes transmitting a force command from the controller to the actuator to thereby cause the actuator to apply the variable electrode force to the work piece, via the electrodes, at a first force level that is held for a first duration.

Additionally, the method includes determining a point in time in a dynamic resistance profile, which is determined offline and pre-recorded in computer-readable memory of the controller, at which a dynamic resistance of the work piece decreases at a threshold rate during a weld cycle of the weld nugget. The controller then increases the variable electrode force to a second force level at the point in time in the dynamic resistance profile. The second force level is maintained until the end of the weld cycle, or as noted above, additional force levels may be used in this same duration.

The above features and advantages and other features and advantages of the present disclosure are readily apparent from the following detailed description of the best modes for carrying out the disclosure when taken in connection with the accompanying drawings.

DETAILED DESCRIPTION

Figure 1:
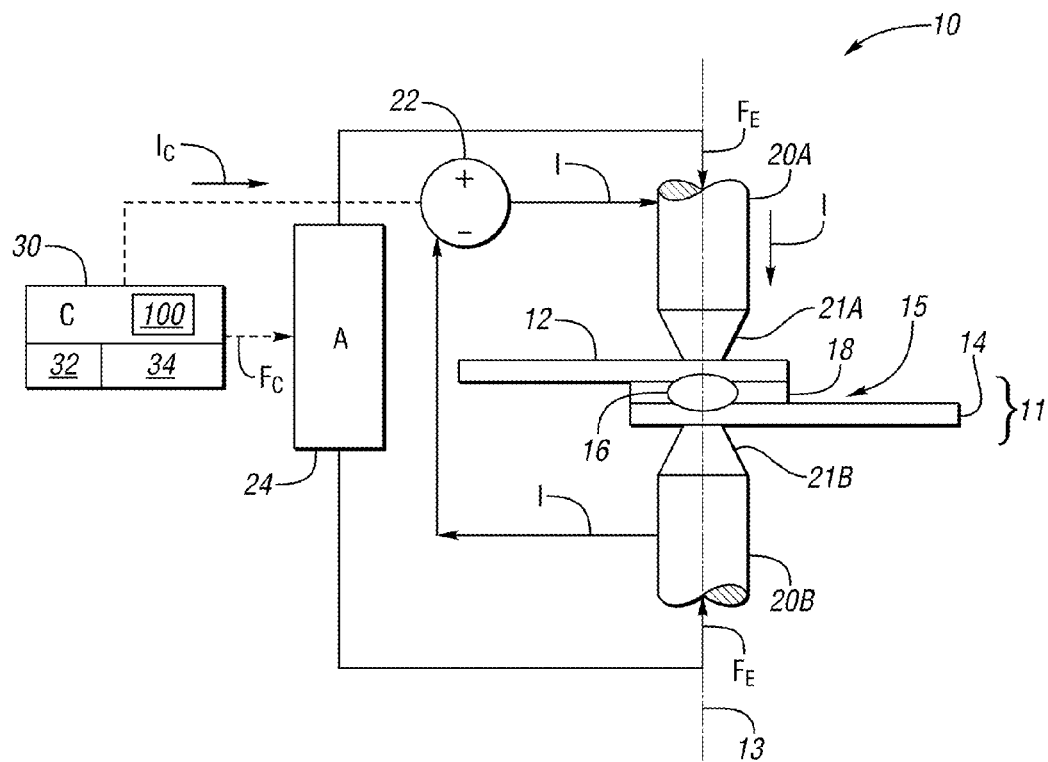
FIG. 1 is a schematic side view illustration of a weld bonding system having a controller which helps to minimize the expulsion of weld spatter material as set forth herein.

Referring to the Figures, wherein like reference numerals refer to like elements, an example resistance welding system 10 is shown generally at 10 in FIG. 1. The welding system 10 may be used to join adjacent metal substrates of a work piece 11, e.g., respective first and second metal substrates 12 and 14, via the process of resistance spot welding, with or without the use of structural adhesives. In such processes, a solid weld nugget 16 is ultimately formed between the metal substrates 12 and 14 using the combination of an applied variable electrode force (arrows $F_E$) and an electrical welding current (arrow I). These welding parameters are controlled in a particular manner herein via a controller (C) 30 and logic of an associated control method 100, as described in more detail below with reference to FIGS. 2-6.

Figure 1A:
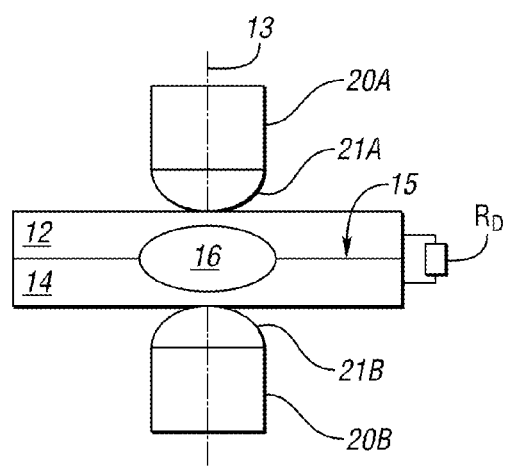
FIG. 1A is a schematic side view illustration of a portion of an alternative resistance welding system to that shown in FIG. 1.

In FIGS. 1 and 1A, the work piece 11 is positioned between a pair of welding electrodes 20A, 20B having a central longitudinal axis 13. The welding electrodes 20A and 20B include respective removable electrode caps 21A and 21B. Thus, the electrode caps 21A and 21B may be removed as needed for cleaning, redressing, or other maintenance operations.

Figure 6:
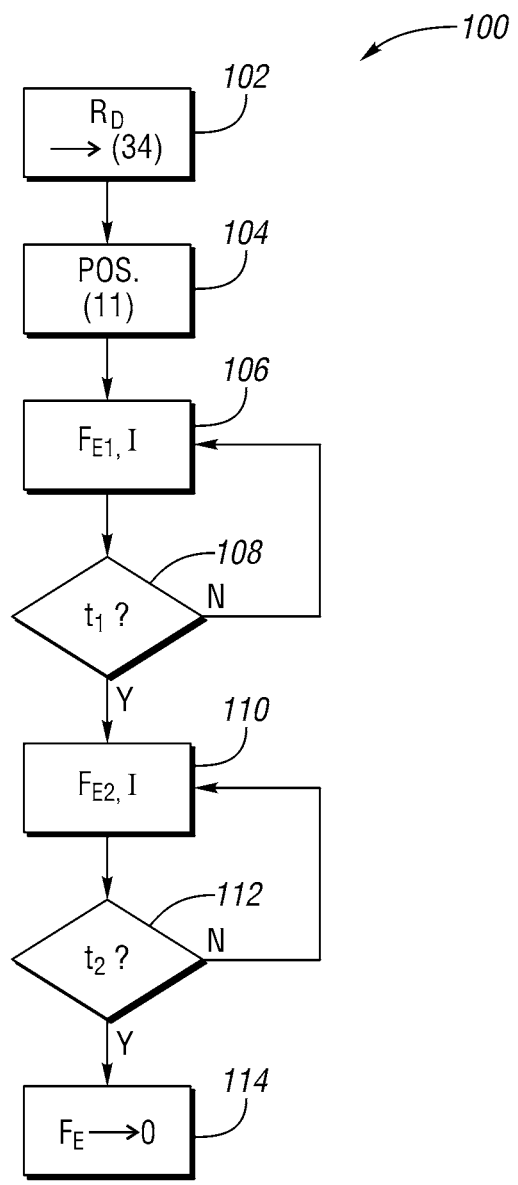
FIG. 6 is a flow chart describing an example method for minimizing the expulsion of weld spatter material in the systems shown in FIGS. 1 and 1A.

Conventional spot welding techniques would apply a calibrated, constant electrode force to the work piece 11. However, internal pressure due to growth of the molten metal between adjacent substrates quickly builds as heat at the interfacing or faying interface 15 rapidly increases. At some point in the weld cycle, the internal pressure exceeds the applied constant electrode force. When this occurs, molten metal is expelled from between the adjacent substrates, frequently as a brilliant shower of sparks of the type noted above. Some of this molten material is ultimately deposited as weld spatter on exposed surfaces. The method 100, an example of which is shown in FIG. 6, is intended to minimize the expulsion of such weld spatter material via a multi-step application of increasing force.

The method 100, along with the associated welding system 10 shown schematically in FIGS. 1 and 1A, may be useful, for example, in automotive and non-automotive applications requiring welded body panels or other welded components. The method 100 is of particular value in the resistance welding of products having one or more finished cosmetic show surfaces, the appearance of which is considered to be of importance to overall product quality. The presence of weld spatter is to be avoided on such surfaces.

The resistance welding system 10 of FIG. 1 is an example weld bonding system wherein a thin layer of adhesive material 18 such as heat curable epoxy is deposited at the faying interface 15 between the adjacent first and second metal substrates 12 and 14. FIGS. 1 and 1A are intended to be schematic, and thus are not necessarily drawn to scale. Therefore, the thickness of the layer of adhesive material 18 is greatly exaggerated in FIG. 1 for illustrative clarity. Use of the adhesive material 18 is intended to create welds having increased static and dynamic strengths. When performing the process of weld bonding, a shim (not shown) may be positioned between the first metal substrate 12 and a stationary member (not shown), e.g., a table or work platform, so as to maintain a desired orientation of the respective first and second metal substrates 12 and 14.

Figure 4:
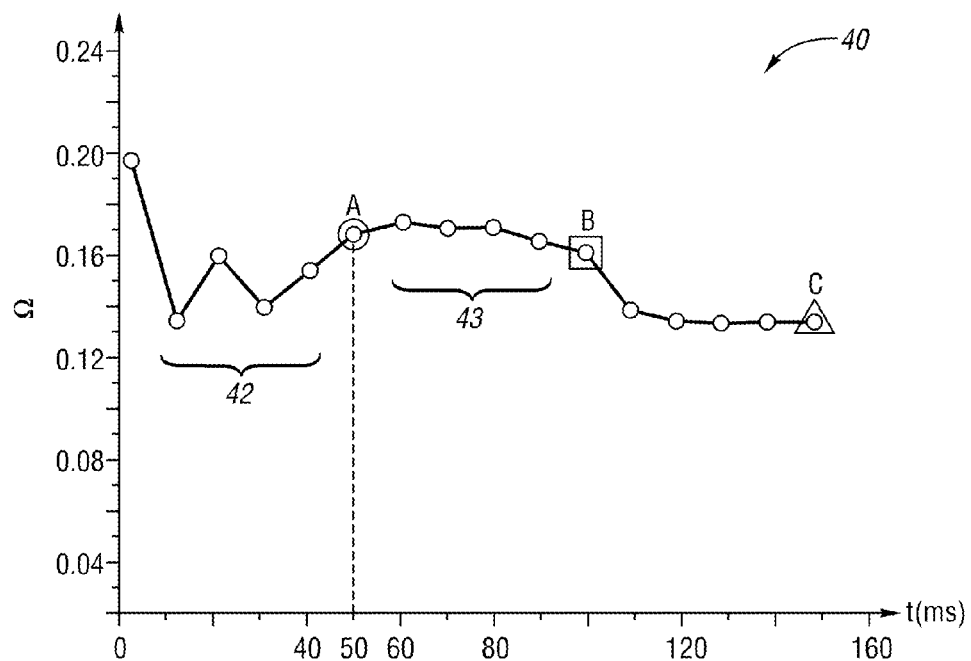
FIG. 4 is an example graphical dynamic resistance diagram for the system shown in FIG. 1, with dynamic resistance plotted on the vertical axis and time plotted on the horizontal axis.

Referring briefly to FIG. 1A, an alternative resistance welding application omits the use of adhesive material 18 of FIG. 1. In such a process, the first and second metal substrates 12 and 14 are positioned immediately adjacent to one another as shown prior to the formation of the weld nugget 16. As shown in FIG. 1A, dynamic resistance ($R_D$), i.e., the change in welding voltage ($\Delta V$) divided by the change in electrical current ($\Delta I$) during formation of the weld nugget 16, can be measured offline as a prelude to execution of the method 100, with measurement of such a value being well understood in the art. The materials and thicknesses of a given work piece 11 are known beforehand. Therefore, by using simple electrical measurements and calculations, a calibrated dynamic resistance profile, an example of which is shown in FIG. 4, can be pre-recorded in memory 34 of the controller 30 and used in the execution of method 100 during real time welding of the work piece 11.

The first and second metal substrates 12 and 14 of FIGS. 1 and 1A may have a thickness that varies depending on the intended application and use of the work piece 11. A typical automotive application, for instance, may see thicknesses ranging upward from about 0.4 mm. Likewise, the metal substrates 12 and 14 may be formed from any suitable material for a desired application of the work piece 11. For example, the metal substrates 12 and 14 may be formed from easily weldable steels such as, but not limited to, low carbon steels and high-strength steels. Other materials may be envisioned, including aluminum, with the choice of material affecting the specific parameters used to execute the method 100, as described in more detail below with reference to FIGS. 2-6.

Still referring to FIG. 1, the controller 30 may be embodied as a computer device or suite of such devices. In particular, the controller 30 may include a processor 32 and the memory 34, i.e., tangible, non-transitory, computer-readable media on which is recorded instructions for executing the method 100. Examples of the memory 34 may include read only memory (ROM), optical memory, flash memory, and the like. The controller 30 may also include transitory memory such as random access memory (RAM) and erasable electrically-programmable read only memory (EEPROM). Associated hardware may include a high-speed clock, analog-to-digital (A/D) circuitry, digital-to-analog (D/A) circuitry, and any required input/output (I/O) circuitry and devices, including a transceiver, as well as signal conditioning and buffer electronics.

The welding system 10 includes an actuator (A) 24. While omitted from FIG. 1A for simplicity, the actuator 24 and controller 30 of FIG. 1 are also used in that embodiment. The actuator 24 may be an electrically-actuated linear servo actuator, although the approach could also be extended to conventional automatic or manual pneumatic or other welding actuator types. A linear servo actuator of the type known in the art is used to generate a weld force almost instantaneously, without the need for standby compressed air, and with less electrode wear than conventional pneumatic weld guns. Suitable linear servo actuator designs may include roller screws and the like.

Regardless of its design, the actuator 24 of FIG. 1 is configured to receive a force command (arrow $F_C$) from the controller 30. In response to receipt of this command, the actuator 24 applies the variable electrode force (arrows $F_E$) to the work piece 11. The weld nugget 16 is then formed via a concurrent application of the welding current (arrow I), which the controller 30 likewise commands. This may be achieved via transmission of a welding current command (arrow $I_C$) to a welding power supply 22, shown here schematically for simplicity as an example DC device, although AC power may be used in an alternative embodiment.

Figure 2:
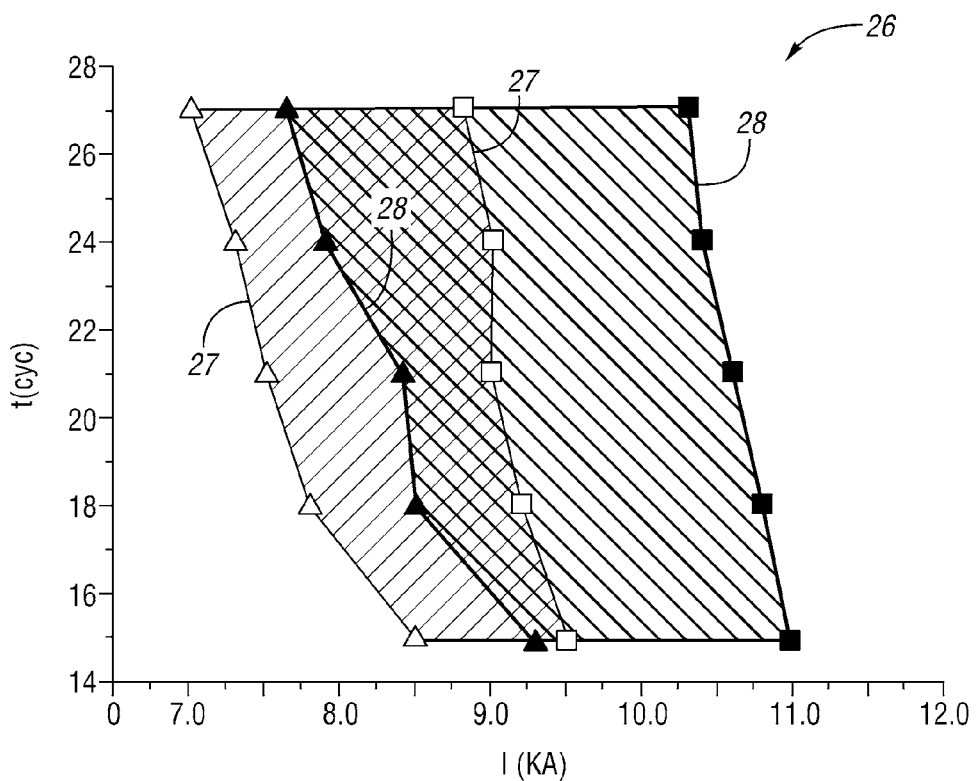
FIG. 2 is a set of graphical weld lobe diagrams, wherein welding cycle time is plotted on the vertical axis and electrical welding current is plotted on the horizontal axis.

Referring to FIG. 2, an example welding lobe diagram 26 is shown for an arbitrarily acceptable weld. As is known in the art, a welding lobe diagram describes, for a given applied electrode force, the welding current (I) on the horizontal axis and the corresponding welding time (t) on the vertical axis, with the welding time given in welding cycles (cyc) in FIG. 1 and weld current (I) given in kA. A given piece of metal, such as the first or second metal substrates 12 and 14 of FIG. 1, has a corresponding lobe diagram. With a narrower lobe, such as the weld lobe 27, a less than robust process may result during production, which may be a prominent issue in weld-bonding of high strength steels. That is, welding may be difficult to achieve within the narrow boundaries of weld lobe 27 given electrical fluctuations and competing energy demands in a typical manufacturing facility. The present approach as set forth herein is intended to provide a much wider welding lobe, e.g., the welding lobe 28, for the same metal substrate 12 or 14.

Figure 3:
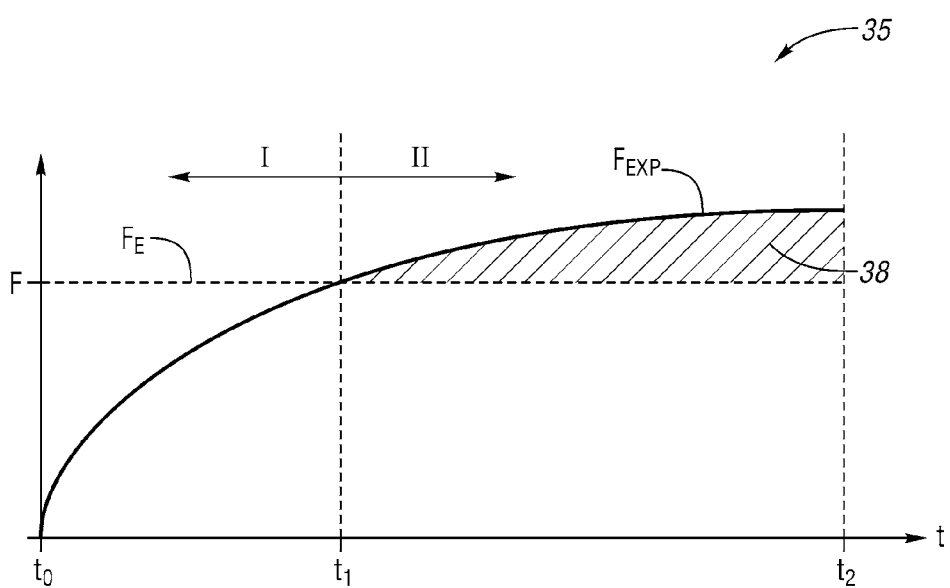
FIG. 3 is a schematic time plot illustrating the effect of increased welding time, plotted on the horizontal axis, on the weld expansion force (vertical axis).

Referring to FIG. 3, a schematic time plot 35 shows the effects of welding time on the expansion force ($F_{EXP}$) for molten material under a given electrode force ($F_E$), with force (F) depicted on the vertical axis and welding time (t) depicted on the horizontal axis. The first and second metal substrates 12 and 14 of FIGS. 1 and 1A each have electrical and thermal properties that make resistance welding possible. That is, each metal substrate 12 and 14 provides a level of dynamic resistance (R) to the flow of the welding current (arrows I). This resistance causes Joule heating to occur as the welding current (arrows I) passes through the work piece 11. Mathematically, the heat energy (E) during this process may be expressed as $E=I^2 \times R \times t$. Thus, energy in the weld zone increases as welding current increases.

As welding commences at $t_0$ in Zone I of FIG. 3 and continues to $t_1$, the expansion force ($F_{EXP}$) of the entrapped molten material rapidly increases with increasing welding time (t). Weld expulsion and spatter may occur after $t_1$ in Zone II when the applied electrode force ($F_E$) is less than the expansion force ($F_{EXP}$) due to the growth of the molten metal, i.e., within shaded region 38. In order to avoid undesirable weld expulsion, the controller 30 of FIG. 1 is configured to modify the electrode force ($F_E$), via one or more precisely timed steps in the electrode force ($F_E$) during the welding cycle, so as to ensure that the applied electrode force ($F_E$) always exceeds the weld expansion force ($F_{EXP}$) due to the growth of the molten metal. Determination of the expansion force in real time is not practicable. Therefore, reference is made to the pre-recorded dynamic resistance profile for a work piece 11 of the same materials and thicknesses used in production as set forth below.

Referring to FIG. 4, based on the dynamic resistance $R_D$ (see FIG. 1A) of resistance welding or weld bonding of a given multi-sheet stack up, a variable electrode force ($F_E$) is adopted as a means to contain weld expansion and minimize the occurrence and/or severity of weld material expulsion. In FIG. 3, this means avoiding entry into shaded region 38. Such an approach may be of particular benefit in the welding or weld bonding of steel sheets, e.g., 1.6 mm thick galvanized DP780 steel. The variable electrode force ($F_E$) is used to selectively widen the weld lobe for a given material.

Time plot 40 of FIG. 4 depicts welding time (t) in milliseconds (ms) on the horizontal axis and dynamic resistance in Ohms ($\Omega$) on the vertical axis. Time plot 40 is illustrative of an example weld bonding of an example piece of 0.8 mm thick galvanized steel using a heat curable structural adhesive. The axis values would therefore change for other materials or sheet thicknesses.

In Zone 42, dynamic resistance starts out at a peak of about $0.2\Omega$. The electrode force ($F_E$) of FIG. 1 thins out the layer of adhesive material 18, thereby enhancing the intimate contact of the first and second metal substrates 12 and 14 at the faying interface. Resistance drops as the electrode force compresses the work piece 11 of FIG. 1. Here, bulk metal resistivity becomes dominant due to Joule heat generation.

At about t=50 ms, and as a result of Joule heating, the weld nugget 16 of FIG. 1 initiates at point A and grows in Zone 43 as dynamic resistance begins to rise. Welding current continues to heat the metal substrates 12 and 14 of FIG. 1. Dynamic resistance is essentially level or gradually decreasing until point B, at which point dynamic resistance drops off sharply. This detectable event occurs at about t=110 ms in the example illustration. For work pieces 11 having different metals or gage thicknesses, the actual times coinciding with points A and B will differ. However, the phenomenon of the detectable decrease in dynamic resistance, and the recognition made herein that this coincides with entry into the shaded region 38 of expulsion shown in FIG. 3, is used by the controller 30 of FIG. 1 in executing the present control method 100.

Figure 5:
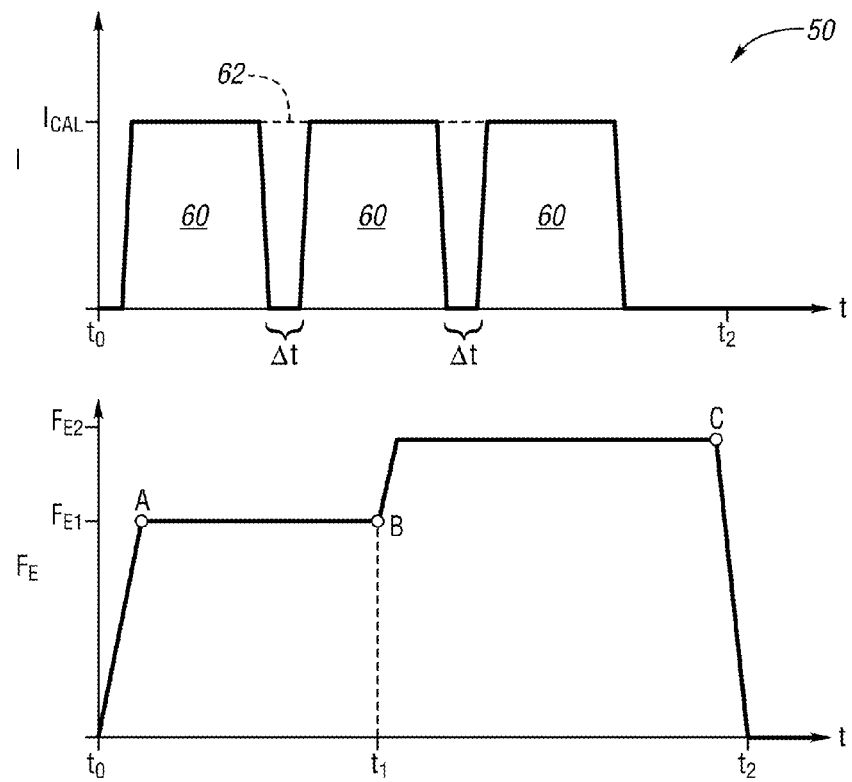
FIG. 5 is an example graphical combined welding current and force diagram for the system shown in FIG. 1, with current and force plotted on the vertical axis and time plotted on the horizontal axis.

Referring to FIG. 5, a pair of time plots 50 describes the changing welding current I and the electrode force ($F_E$), both plotted versus time (t) on the horizontal axis. In order to form the weld nugget 16 of FIG. 1 or 1A, the controller 30 of FIG. 1 commands the electrode force ($F_E$) at a first level, $F_{E1}$, while stepping the welding current (I) to a calibrated level ($I_{CAL}$). For thicker stack ups of about 1-2 mm or more, welding current (I) may be pulsed as shown, i.e., broken up into a series of repeating current pulses 60. Such an approach is intended to regulate heat, with intermittent cooling provided in the time gaps ($\Delta t$) between the welding pulses 60. This may also help protect the electrodes 20A, 20B of FIGS. 1 and 1A. For thinner stack ups, a single current pulse 60 may be used, as indicated by line 62. In either approach, the current pulses 60 or pulse 62 are discontinued prior to releasing the electrode force ($F_E$) as shown.

The controller 30 of FIG. 1 maintains the electrode force ($F_E$) at the first level ($F_{E1}$) from point A of FIG. 5, i.e., the start of the weld nugget 16 of FIGS. 1 and 1A, until point B. As shown in FIG. 4, point B coincides with the detected drop in dynamic resistance, which in turn coincides with the start of expulsion (shaded region 38 of FIG. 3). Because point B will vary with the specific metal and gage thickness, this information may be determined beforehand and recorded in memory 34 of the controller 30.

Thereafter, the controller 30 of FIG. 1 can detect when point B occurs, i.e., at $t_1$, and immediately increase the electrode force ($F_E$) to a higher second level ($F_{E2}$). The higher second level ($F_{E2}$) is then maintained through the end of the weld cycle, i.e., at point C, which is shortly before $t_2$. The electrode force ($F_E$) is then discontinued, and the process shown in FIG. 5 repeats for a subsequent weld.

In a particular embodiment, the second level $F_{E2}$ may be about 115% to 125% of the first level ($F_{E1}$). In another embodiment, a second level of 120% may be used, with the increase occurring anywhere from about 40% to 60% of the total welding cycle time. Other embodiments may be envisioned without departing from the intended inventive scope.

For instance, while the emerging use of linear servo actuators facilitates the present approach, similar concepts could be applied to pneumatic actuators, whether automated or manual.

Also, while a single step in electrode force ($F_E$) is detailed herein, other embodiments may include an additional step or steps in electrode force ($F_E$), such as in the case of materials exhibiting multiple threshold drops in dynamic resistance during the weld cycle. In principle, multiple drop offs could occur, particularly when welding three or four sheets as opposed to the two-sheet stack up shown in the simplified embodiments of FIGS. 1 and 1A. In such cases, weld expulsion could develop at different times and at different faying interfaces 15.

Referring to FIG. 6, an example embodiment of method 100 begins with step 102, wherein the dynamic resistance ($R_D$) of a given stack of work pieces is measured and recorded in memory (34) of the controller 30 shown in FIG. 1. This step may occur offline prior to welding, using the same materials that will be used in production. The time plot 40 of FIG. 4 will be generated as part of step 102 for a specific material and thickness.

This plot 40 contains the specific weld time at point B at which the dynamic resistance rapidly drops off in Zone 43. A calibrated threshold rate or slope may be recorded in memory 34 of the controller 30 and used to determine whether the drop off is significant enough to reflect entry into the shaded region 38 of FIG. 3, i.e., the region indicating expulsion is imminent.

Design of experiments or other offline testing can be conducted to isolate this point for a given material stack up. However, it is noted herein that the drop off in dynamic resistance in typical industrial welding of the first and second metal substrates 12 and 14 has been found to occur within the range of about 40% to 60% of the duration of the weld cycle. Further isolation of this range may be readily determined offline for a given work piece 11. Once recorded, either as the entire time plot 40 or merely the welding time at point B of FIG. 4, the method 100 proceeds to step 104.

Step 104 entails positioning the work piece 11 of FIG. 1 or 1A into the welding system 10 prior to commencing the welding operation. The method 100 proceeds to step 106 once step 104 is completed.

At step 106, the controller 30 of FIG. 1 transmits the current command (arrow $I_C$) to the welding power supply 22 and commands the electrode force at the first level, i.e., $F_{E1}$, as best shown in FIG. 5. Formation of the weld nugget 16 commences. As welding continues in Zone 42 of FIG. 4, the method 100 proceeds to step 108.

Step 108 entails determining, e.g., via reference to a timer, whether the present welding time coincides with the occurrence of point B in FIG. 4, i.e., the point in time in the weld cycle wherein the dynamic resistance drops off in Zone 43 at the calibrated rate. The method 100 proceeds to step 110 when this occurs. Otherwise, step 106 is repeated.

At step 110, the controller 30 of FIG. 1 commands the electrode force at the second force level, i.e., $F_{E2}$, as best shown in FIG. 5. Formation of the weld nugget 16 continues at this higher electrode force. As noted above, the level of the second electrode force ($F_{E2}$) may be about 115% to 125% of the first level ($F_{E1}$) from step 106. As welding continues in Zone 43 of FIG. 4, the method 100 proceeds to step 112.

Step 112 entails determining, e.g., via reference to the timer noted in step 108, whether welding time is complete, which may be a material and work piece-specific calibrated value recorded in memory 34 of the controller 30. This point in time coincides with $t_2$ of FIG. 5. The method 100 discontinues transmission of the welding current command (arrow $I_C$ of FIG. 1) shortly before this time, as shown in FIG. 5, and proceeds to step 114 when the welding cycle is complete. Although not shown in FIG. 6 for simplicity, additional force levels could be commanded that are higher than the second force level ($F_{E2}$) in embodiments having more sheets than the two shown in FIGS. 1 and 1A, as noted above. In such an embodiment, the controller 30 could increase the variable electrode force ($F_E$) from the second force level ($F_{E2}$) to a third force level before the end of the weld cycle. In the embodiment of FIGS. 1 and 1A, step 110 is repeated until the calibrated welding time is complete at step 112, and then proceeds to step 114.

At step 114, the controller 30 ceases transmission of the force command (arrow $F_C$) of FIG. 1 to release the electrodes 20A, 20B. As shown in FIG. 5, the electrode force ($F_E$) rapidly drops to zero. The method 100 is finished, and may be repeated with the subsequent weld.

As will be appreciated by those having ordinary skill in the art, use of the present method would require certain modifications to conventional pneumatic pressure delivery systems. In particular, because the present method requires a two-stage delivery of pressure, any pneumatic variant must be able to deliver pressure at such levels, for instance using a smaller cylinder followed by delivery of pressure from a larger cylinder a threshold amount of time later, coupled with the ability to rapidly recharge these cylinders prior to the subsequent weld.

While the best modes for carrying out the disclosure have been described in detail, those familiar with the art to which this disclosure relates will recognize various alternative designs and embodiments for practicing the disclosure within the scope of the appended claims.

The invention claimed is:

1. A system for forming a weld nugget in a metal work piece, the system comprising:
    a welding power supply;
    an actuator;
    a pair of electrodes operatively connected to the welding power supply and to the actuator, the actuator being operable to deliver a variable electrode force to the work piece via the pair of electrodes in response to a force command; and
    a controller having a processor and non-transitory computer-readable memory, the memory including a calibrated dynamic resistance profile for the work piece and instructions, executable via the processor, for forming the weld nugget, the controller being configured to:
        transmit a welding current command to the welding power supply to thereby cause the welding power supply to output a welding current to the metal work piece, via the pair of electrodes, and thereby form molten metal from the metal work piece;
        identify a welding time in the calibrated dynamic resistance profile at which an expansion force of the molten metal increases and a dynamic resistance of the work piece decreases at a predetermined threshold rate during a weld cycle of the weld nugget;
        transmit the force command to the actuator to apply the variable electrode force, via the pair of electrodes, to the work piece at a first force level for a first duration; and
        command the actuator to increase the variable electrode force from the first force level to a second force level at the identified welding time and thereby minimize expulsion of the molten metal, wherein the second force level commences immediately upon conclusion of the first duration.

2. The system of claim 1, wherein the actuator is a linear servo actuator.

3. The system of claim 1, wherein the actuator is a pneumatic actuator.

4. The system of claim 1, wherein the second force level is at least 115% of the first force level.

5. The system of claim 1, wherein the second force level is between approximately 115% and 125% of the first force level.

6. The system of claim 1, wherein the first duration is between 40% and 60% of a duration of the weld cycle.

7. The system of claim 1, wherein the controller is further configured to identify, in the calibrated dynamic resistance profile, a weld expansion force at the weld expansion time, and wherein the second force level is greater than the identified weld expansion force.

8. The system of claim 1, wherein the second force level is applied for a second duration, and wherein the controller is configured to repeatedly modify the second force level during the second duration to ensure the applied variable electrode force is greater than the expansion force of the molten metal.

9. The system of claim 1, wherein the welding power supply includes a direct current (DC) device.

10. A method for forming a weld nugget in a metal work piece, the metal work piece being positioned with respect to a pair of electrodes operatively connected to a welding power supply and to an actuator, the method comprising:
    transmitting a welding current command from a controller to the welding power supply to thereby cause the welding power supply to output a welding current to the metal work piece, via the pair of electrodes, and thereby form molten metal from the metal work piece;
    transmitting a force command from the controller to the actuator to thereby cause the actuator to apply the variable electrode force to the work piece, via the pair of electrodes, at a first force level for a first duration;
    determining a point in time in a dynamic resistance profile, pre-recorded in non-transitory computer-readable memory of the controller, at which an expansion force of the molten metal increases and a dynamic resistance of the work piece decreases at a threshold rate during a weld cycle of the weld nugget;
    causing the actuator to increase the variable electrode force to a second force level at the point in time in the dynamic resistance profile and thereby minimize expulsion of the molten metal; and
    maintaining the second force level until the end of the weld cycle.

11. The method of claim 10, wherein the first duration is between 40% and 60% of a duration of the weld cycle of the weld nugget.

12. The method of claim 10, wherein the work piece includes a first and a second metal substrate, the method further comprising: applying a layer of adhesive material to a faying interface of the first and second metal substrates prior to transmitting the welding current command and the force command.

13. The method of claim 10, wherein the actuator includes a linear servo actuator, and wherein the transmitting the force command from the controller to the actuator includes transmitting a linear force command to the linear servo actuator.

14. The method of claim 10, wherein the second force level is at least 115% of the first force level.

15. The method of claim 10, wherein the second force level is between approximately 115% and 125% of the first force level.

16. A system for forming a weld nugget in a metal work piece, the system comprising:
    a welding power supply;
    a linear servo actuator;
    a pair of electrodes operatively connected to the welding power supply and to the linear servo actuator, the actuator being operable to deliver a variable electrode force to the work piece via the pair of electrodes in response to a force command; and
    a controller having a processor and non-transitory computer-readable memory, the memory including a calibrated dynamic resistance profile for the work piece and instructions, executable via the processor, for forming the weld nugget, the controller being configured to:
        transmit a welding current command to the welding power supply to thereby cause the welding power supply to output a welding current to the metal work piece, via the pair of electrodes, and thereby form molten metal from the metal work piece;
        identify a welding time in the calibrated dynamic resistance profile at which an expansion force of the molten metal increases and a dynamic resistance of the work piece decreases at a predetermined threshold rate during a weld cycle of the weld nugget;
        transmit the force command to the linear servo actuator to apply the variable electrode force, via the pair of electrodes, to the work piece at a first force level for a first duration that is between 40% and 60% of a weld cycle needed for forming the weld nugget; and
        at the identified welding time, command the actuator to increase the variable electrode force from the first force level to a second force level that is between 115% and 125% of the first force level immediately upon conclusion of the first duration, thereby minimizing expulsion of the molten metal.

17. The system of claim 16, wherein the controller is configured to maintain the variable electrode force at the second force level until the end of the weld cycle.

18. The system of claim 16, wherein the controller is further configured to increase the variable electrode force from the second force level to a third force level before the end of the weld cycle.

19. The system of claim 16, wherein the controller is further configured to identify, in the calibrated dynamic resistance profile, a weld expansion force at the weld expansion time, and wherein the second force level is greater than the identified weld expansion force.

20. The system of claim 16, wherein the welding power supply includes a direct current (DC) device.

* * * * *